United States Patent
Sioui et al.

(10) Patent No.: US 6,506,510 B1
(45) Date of Patent: Jan. 14, 2003

(54) HYDROGEN GENERATION VIA METHANE CRACKING FOR INTEGRATED HEAT AND ELECTRICITY PRODUCTION USING A FUEL CELL

(75) Inventors: Daniel R. Sioui, Arlington Heights, IL (US); Gavin P. Towler, Barrington, IL (US); Anil R. Oroskar, Oakbrook, IL (US); Lubo Zhou, Fox River Grove, IL (US); Stephen R. Dunne, Algonquin, IL (US); Santi Kulprathipanja, Inverness, IL (US); Leonid B. Galperin, Wilmette, IL (US); Frank S. Modica, Naperville, IL (US); Timur V. Voskoboinikov, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 13 days.

(21) Appl. No.: 09/737,990

(22) Filed: Dec. 15, 2000

(51) Int. Cl.[7] .......................... H01M 8/04; H01M 8/12; H01M 2/14
(52) U.S. Cl. ................ 429/17; 429/26; 429/39
(58) Field of Search ............... 429/17, 20, 22, 429/23, 24, 26, 38, 39

(56) References Cited

U.S. PATENT DOCUMENTS

| | | | |
|---|---|---|---|
| 5,335,628 A | | 8/1994 | Dunbar ................ 122/1 R |
| 5,401,589 A | | 3/1995 | Palmer et al. ............ 429/13 |
| 5,432,710 A | | 7/1995 | Ishimaru et al. .......... 364/493 |
| 5,648,182 A | * | 7/1997 | Hara et al. .............. 429/20 |
| 5,693,201 A | * | 12/1997 | Hsu et al. .............. 204/241 |
| 5,714,276 A | * | 2/1998 | Okamoto .............. 429/17 |
| 5,753,383 A | * | 5/1998 | Cargnelli et al. ........ 136/201 |
| 5,985,474 A | * | 11/1999 | Chen et al. ............. 429/17 |
| 6,063,515 A | * | 5/2000 | Epp et al. ............... 429/17 |
| 6,162,267 A | * | 12/2000 | Priegnitz et al. .......... 252/373 |
| 6,375,924 B1 | * | 4/2002 | Towler et al. ............ 252/373 |

OTHER PUBLICATIONS

"Hydrogen production via the direct cracking of methane over silica-supported nickel catalysts" by Tiejun Zhang et al., *University of South Carolina USA, Elsevier Science* B.V. 1998, No month available.

"New Hydrocarbon Proton Exchange Membranes Based on Sulfonated Styrne-EthyleneButylene-Styrnee Triblock Copolymers" by G.E. Wnek et al., *Presented in the Electrochemical Society Proceedings* 1995. No month available.

"Will Developing Countries Spur Fuel Cell Surge?" by Rajindar Singh et al., *Chemical Engineering Progress*, Mar. 1999, pp. 59–66. No month available.

* cited by examiner

*Primary Examiner*—Carol Chaney
*Assistant Examiner*—Donald Scaltrito
(74) *Attorney, Agent, or Firm*—John G. Tolomei; Frank S. Molinaro; Arthur E. Gooding

(57) ABSTRACT

A novel integrated system for the co-production of heat and electricity for residences or commercial buildings is based on the cracking of hydrocarbons to generate hydrogen for a fuel cell. Compared to prior art reforming methods for hydrogen production, the cracking reaction provides an input stream to the fuel cell that is essentially free of CO, a known poison to the anode catalyst in many fuel cell designs, such as PEM fuel cells. The cracking reaction is coupled with an air or steam regeneration cycle to reactivate that cracking catalyst for further use. This regeneration can provide a valuable source of heat or furnace fuel to the system. A novel control method for system adjusts the durations of the cracking and regeneration cycles to optimize the recovery of reaction heat.

48 Claims, 3 Drawing Sheets

HYDROGEN GENERATION VIA METHANE CRACKING FOR INTEGRATED HEAT AND ELECTRICITY PRODUCTION USING A FUEL CELL

FIELD OF THE INVENTION

The present invention relates to a novel apparatus and process for providing integrated heat and electricity needs for a building or residence using a fuel cell. Hydrogen production for consumption in the fuel cell (i.e. fuel processing) is based on the catalytic cracking of hydrocarbons (e.g. methane), followed by the regeneration of the resulting coked cracking catalyst using either oxygen or steam. The high temperature effluent gas from this regeneration step is useful in residential heating and even cooling applications if sorption cooling is incorporated.

BACKGROUND OF THE INVENTION

Fuel cells are chemical power sources in which electrical power is generated in a chemical reaction. The most common fuel cell is based on the chemical reaction between a reducing agent (e.g. hydrogen) and an oxidizing agent (e.g. oxygen). The consumption of these agents is proportional to the power load demanded from the fuel cell.

A specific, common fuel cell operation therefore comprises passing a hydrogen-rich feed stream, usually generated locally by a fuel processor, to the anode side of the fuel cell while simultaneously passing an oxygen-containing stream (e.g. air) to the cathode side of the fuel cell. The gases that contact both the anode and cathode sides of fuel cell are directed through porous metal plates separated by an electrolyte bath or a solid polymer electrolyte serving as a medium for the passage of ions. The plates have a single electrical connection to each other outside of the electrolyte. The anode plate converts molecular hydrogen to hydrogen ions, which migrate through the electrolyte bath or solid polymer, and electrons, which flow along a wire connected to the cathode plate. On the cathode side, molecular oxygen is cleaved into oxygen atoms that combine with the hydrogen ions and anode electrons to create water and heat. In this process, which is essentially the reverse of electrolysis, electricity can be utilized from the flow of electrons along the anode/cathode circuit, while water and heat are expelled from the electrolyte material as steam. This steam can be utilized either for heating applications and/or for humidifying the gas streams flowing to the fuel cell.

The hydrogen for use in fuel cells is typically produced at a point near the fuel cell, because hydrogen has a low volumetric energy density compared to fuels such as gasoline, making hydrogen costly to transport. A summary of fuel cell technical developments and associated methods of producing hydrogen is provided in "Will Developing Countries Spur Fuel Cell Surge?" by Rajindar Singh (*Chemical Engineering Progress,* March 1999, p. 59–66).

In fuel cells relying on the overall conversion of hydrogen and oxygen to water for electricity generation, polymers with high protonic conductivities (i.e. solid polymer electrolytes) are useful as proton exchange membranes (PEMs). Among the earliest proton exchange membranes were sulfonated, crosslinked polystyrenes. More recently sulfonated fluorocarbon polymers have been considered. Such proton exchange membranes are described in an article entitled, "New Hydrocarbon Proton Exchange Membranes Based on Sulfonated Styrene-Ethylene/Butylene-Styrene Triblock Copolymers", by G. E. Wnek, J. N. Rider, J. M. Serpico, A. Einset, S. G. Ehrenberg, and L. Raboin presented in the Electrochemical Society Proceedings (1995), Volume 95–23, pages 247 to 251. PEM fuel cells are characterized as operating at relatively low temperatures (e.g. 100° C.), having a high power density, varying output quickly in response to shifts in demand, and being suitable for applications where quick startup is needed.

Because fuel cell operation does not involve the emission of hydrocarbons, sulfur oxides and nitrogen oxides into the environment, the applicability of fuel cells for electric powered vehicles is an attractive area of ongoing development. More immediate commercial uses of fuel cells involve stationary applications such as local electricity generation for business or residential consumption. Currently, most homes receive their electric power from a distribution grid operated by a commercial electric power generating company. This electric potential is created in large scale, capital intensive power plants through, for example, the combustion of coal, oil, or natural gas. Nuclear power is also generated in a centralized facility. While the generating efficiencies of these methods vary, all involve significant efficiency losses associated with power distribution to individual consumers.

Since fuel cells generate electrical power locally, they represent an alternative to current centralized power production and distribution systems. As mentioned, a fuel cell relies on the production of hydrogen from a fuel processor as its fuel source. This production results from the catalytic conversion of a hydrocarbon or alcohol feedstock into a hydrogen-rich product. In terms of this hydrogen generation, the prior art is generally directed to the reforming of hydrocarbons in the presence of steam (i.e. steam reforming). This process is an endothermic chemical reaction that requires a significant amount of heat input to drive the reforming reaction toward the production of hydrogen. Alternatively, the partial oxidation of hydrocarbons is a viable and commonly used means of hydrogen production. Partial oxidation refers to an exothermic reaction requiring the removal of heat for the equilibrium reaction to favor the production of the desired hydrogen-rich fuel. Often, in order to more efficiently balance the heat input requirement for the reforming reaction with the heat removal necessary for the partial oxidation, the two reactions are carried out simultaneously, typically in a catalytic autothermal reforming operation.

In addition to hydrogen generation techniques, the prior art also addresses the use of fuel cells for the integrated production of both electricity and heat. Because of the nature of the hydrogen generation chemistry and the fuel cell operation itself, such co-generation schemes can result in more efficient energy utilization than electricity production alone. Heat that is present in the hydrogen-rich reformate gas (i.e. reformer effluent) after being exposed to typical hydrocarbon reforming temperatures of 300° C. to 650° C. can be advantageously transferred to, for example, a heat distribution medium flowing through a home radiator. After such heat exchange, the cooled reformate is suitable for electricity generation in the fuel cell. Heat produced from the operation of the fuel cell itself, namely the heat of formation of water, may likewise be recovered for heating purposes.

Specific integrated electricity/heat generation flow schemes incorporating fuel cells are provided in prior art disclosures. For example, U.S. Pat. No. 5,335,628 includes a water recirculation loop that provides cooling to a fuel cell as well as heat for a boiler system. The boiler heat may be used, in turn, to provide energy for the reforming reaction that provides hydrogen to the fuel cell. In. addition, U.S. Pat.

No. 5,401,589 discloses that heat produced in a fuel cell stack may be used for a reformer or for space heating. Additionally, the exhaust from a burner of a fuel processor can either 1) drive a turbine or generator for increased electrical power output, or 2) provide process or additional space heating. U.S. Pat. No. 5,432,710 discloses a system that includes a fuel cell, a reformer for supplying hydrogen to the fuel cell, a boiler, and a control system for optimizing energy utilization and costs. Finally, U.S. Pat. No. 5,985,474 describes a system of an integrated fuel processor, fuel cell, and furnace for providing heat and electrical power to a building. The flow of fuel to the fuel processor and/or the flow of reformate directly to the furnace may be varied or regulated using a controller, according to the heat and electricity demands of the building.

While these prior art integrated electricity/heat generating fuel cell systems rely on the reforming of hydrocarbons as a source of hydrogen, the reforming chemistry itself has associated disadvantages. Most notable of these is the co-production of carbon monoxide which is known to poison catalyst metal (e.g. platinum) used to catalyze the anode reaction in a typical PEM fuel cell. The hydrogen-rich reformate contains as much as 15% CO by volume, and this level must typically be reduced to the order of 20 ppm or less for satisfactory performance of the fuel cell. The reduction of CO is generally accomplished through the promotion of the water-gas shift reaction in reactors separate from the reformer and/or preferential oxidation of the carbon monoxide to carbon dioxide. Otherwise, high pressure operations such as membrane or cryogenic separation may be employed. A second disadvantage associated with hydrocarbon reforming as a means of hydrogen production is the highly endothermic nature of the primary reaction. The steam reforming of methane, for example, proceeds as follows:

$$CH_4 + H_2O \rightarrow CO + 3H_2$$

with a standard heat of reaction of about 52 kcal/mole at 550° C. A significant heat input is therefore required to maintain a specified reactor temperature.

In contrast to the standard use of hydrocarbon reforming as a means of hydrogen generation, the cracking of hydrocarbons (e.g. methane) in the presence of an iron or nickel containing catalyst to yield elemental carbon and hydrogen does not lead to the co-production of carbon monoxide. Although the hydrogen-rich effluent of the cracking reaction generally contains unconverted hydrocarbons, this stream is suitable, without further treatment, as an anode reactant (i.e. fuel) for supply to a PEM fuel cell. The cracking reaction for methane, namely:

$$CH_4 \rightarrow C + 2H_2$$

requires a heat input of about 20 kcal/mole to maintain a 550° C. reaction temperature. Thus, the cracking reaction provides a considerably less endothermic pathway for hydrogen production than steam reforming. Furthermore, the carbon generated via cracking has been found to deposit in filaments on the catalyst surface, allowing for the growth of considerable carbon strands without significant catalyst deactivation. These findings are reported in detail in a paper by Zhang et al. (*Hydrogen Production via the Direct Cracking of Methane over Silica Supported Nickel Catalysts*, University of South Carolina, USA, Elsevier Science B.V., 1998). The regeneration of the coked catalyst after carbon deposition is achieved using of either oxygen or steam to convert the filamentous deposited carbon to carbon oxides. Oxygen regeneration is well known and is also disclosed in other publications, for example U.S. Pat. No. 3,361,535.

While steam regeneration produces additional hydrogen that may theoretically (after purification to remove CO) be used by the fuel cell, this added production requires a supplementary heat input. Regeneration by oxygen, in contrast, is advantageous in that the reaction is highly exothermic. A portion of the heat produced can be used to supply the energy requirement of the cracking reaction. Furthermore, for the specific application of electricity and heat co-generation to which applicants' invention pertains, the CO formed during the regeneration cycle (i.e. after carbon deposition) is of no consequence since the hot effluent gas is not used in the fuel cell. Rather, the regeneration effluent is instead diverted to a heat exchanger to efficiently utilize reaction heat in satisfying the heating requirements of the building. Alternatively, this gas stream, because of its combustive fuel value, can also be routed, with or without prior heat exchange, to the burner of a heating furnace.

Overall, carbon deposition (i.e. hydrocarbon cracking) followed by catalyst regeneration with oxygen, when used in conjunction with a fuel cell and a heat exchanger, provides significant advantages over prior art systems in terms of simplicity and efficiency. In addition to eliminating the need for hydrogen purification, the carbon deposition process is characterized by a cyclical operation of alternating carbon deposition/regeneration cycles. This coincides favorably with the on-off control scheme of traditional heating systems (e.g. furnaces). Thus, the need for a complicated control algorithm to apportion various flows to a fuel processor and fuel cell, as outlined in the aforementioned U.S. Pat. No. 5,985,474, is avoided.

SUMMARY OF THE INVENTION

In one embodiment the present invention is a system for providing both heat and electricity to a building comprising a first reactor having an inlet for a feed, having an outlet for a product, and defining a catalyst retention space for retaining a catalyst bed. The system also comprises a fuel cell for providing electricity and having an inlet for a hydrogen containing effluent. The system further comprises a heat exchange means for exchanging heat from a high temperature regeneration effluent to a heat distributing medium, the heat exchange means having an inlet for the high temperature regeneration effluent. The system further comprises a first reactor outlet flow diverter, having an inlet in communication with the first reactor outlet, having a first outlet connection in communication with the fuel cell inlet, and having a second outlet connection in communication with the inlet of the heat exchange means, for alternating flow communication between the first reactor outlet and either the fuel cell inlet or the inlet of the heat exchange means. Lastly, the system comprises a first reactor inlet flow diverter, having a first inlet connection in communication with a fuel source, having a second inlet connection in communication with a regenerant source, and having an outlet connection in communication with the first reactor inlet, for alternating flow communication between the first reactor inlet and either the hydrocarbon containing fuel source or the regenerant source.

In another embodiment the present invention is a method of providing both heat and electricity to a building, the method comprising cracking, during a carbon deposition cycle, a hydrocarbon fuel under cracking conditions in a hydrocarbon cracking reactor and in the presence of a catalyst to yield a hydrogen containing effluent. The method further comprises contacting, during a regeneration cycle under regeneration conditions and in the hydrocarbon cracking reactor, a regenerant with carbon deposited on the catalyst during the carbon deposition cycle to regenerate the catalyst and yield a high temperature regeneration effluent. The method further comprises passing the hydrogen containing effluent to a fuel cell anode to generate electricity, exchanging heat from the high temperature regeneration effluent to a heat distributing medium to provide heat to the building, and alternating a feed flow to the hydrocarbon cracking reactor between the hydrocarbon fuel during the carbon deposition cycle and the regenerant during the regeneration cycle. Lastly, the method comprises alternating a product flow from the hydrocarbon cracking reactor between the hydrogen containing effluent to the fuel cell during the carbon deposition cycle and the regeneration effluent to the heat exchanger during the regeneration cycle.

In a final embodiment the present invention is a method of controlling a system for generating both heat and electricity, the system comprising a hydrocarbon cracking reactor, a fuel cell in communication with a hydrogen containing effluent stream from the reactor, a furnace in communication with a regeneration effluent stream from the reactor, and a battery in communication with the fuel cell. The method comprises determining a demand $D_H$ for heat from the furnace from a deviation between a measured temperature and a set point temperature. When $D_H>0$, a carbon deposition cycle time $T_{cd}=T_a$ and a regeneration cycle time $T_{regen}=T_b$ are assigned and fuel gas is allowed to flow to the furnace. When $D_H=0$, a carbon deposition cycle time $T_{cd}=T_1$ and a regeneration cycle time $T_{regen}=T_2$ are assigned, where $T_1<T_a$ and $T_2<T_b$, and fuel gas is prevented from flowing to the furnace. The method further comprises determining a demand $D_E$ for electricity from a deviation between a measured voltage level of the battery and a set point voltage. When $D_E=0$, the step of determining a demand for furnace heat and subsequent steps are repeated. When $D_E>0$, however, a carbon deposition cycle is initiated, the carbon deposition cycle comprising reacting, for a duration $T_{cd}$, a hydrocarbon containing fuel gas stream under cracking conditions in the presence of a catalyst to yield a hydrogen containing effluent stream for generating electricity in the fuel cell and subsequently storing electrical potential in the battery. A regeneration cycle is then initiated, where this cycle comprises reacting, for a duration $T_{regen}$, a regenerant stream under regeneration conditions with carbon deposited on the catalyst during the carbon deposition cycle to yield a regeneration effluent stream for providing heat by combustion in the furnace. Finally, the step of determining a demand for furnace heat and all subsequent steps are repeated for a finite period of operation.

DETAILED DESCRIPTION OF THE INVENTION

Figure 1:
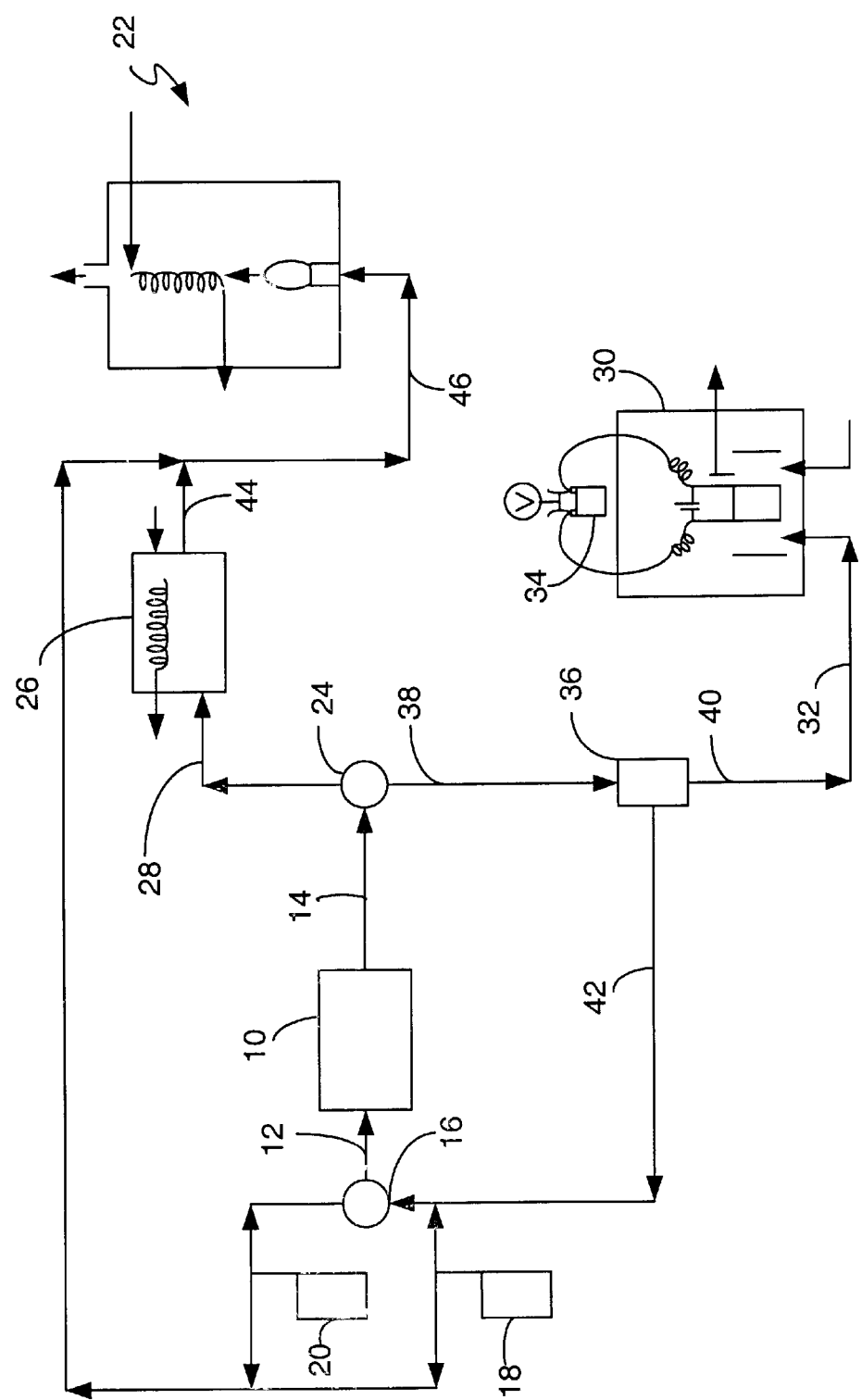
FIG. 1 is a schematic block diagram of one embodiment of the system of the present invention comprising a hydrocarbon cracking reactor, a fuel cell, reactor inlet and outlet flow diverters, and a heat exchanger for recovering the heat from a. catalyst regeneration cycle.

An essential feature of the present invention is a hydrocarbon cracking reactor for generating hydrogen for a fuel cell. In contrast to prior art reforming reactors, the reactor catalytically converts a hydrocarbon in the absence of steam to elemental carbon and molecular hydrogen. This hydrocarbon cracking step, also referred to as carbon deposition, proceeds until the activity of the catalyst used for the cracking reaction deteriorates or declines. Without wishing to be bound by any particular theory, it appears that the mechanism for the activity decline is the accumulation of carbon on the catalyst surface, resulting in the blockage of active metal (e.g. nickel) sites from hydrocarbon reactants. When the catalyst becomes totally inactive, a regeneration step is required to restore activity. More commonly, the cracking reaction will be suspended to regenerate the catalyst at some point prior to total loss of activity, namely, when the catalyst is only partially deactivated.

The hydrocarbon containing fuel that is fed to the cracking reactor is preferably a $C_1$–$C_4$ paraffin, such as methane, ethane, propane, or butane, normally in the gas phase. Methane is especially preferred due to its ready availability in natural gas sources. Thus, the present invention is conveniently operated using a natural gas utility stream typically used for home heating and cooking. While olefins and other unsaturated hydrocarbons may also be cracked, such compounds are susceptible to undesired side reactions such as oligomerization that can lead to accelerated deactivation of the catalyst. If natural gas is used, it should be recognized that suppliers of this energy source often blend a small amount (e.g. 10 ppm) of sulfur compounds, typically as hydrogen sulfide, butyl mercaptan, or butyl sulfide, into the gas for purposes of leak detection. In this case, the sulfur level should be reduced to less than 1 ppm prior to its introduction to the cracking reactor. Otherwise, due to the poisoning effect of the sulfur, the cracking catalyst may become prematurely deactivated and/or the fuel cell operation may be adversely affected.

A commonly used industrial method to reduce sulfur levels in hydrocarbons is known in the art as hydrodesulfurization, in which the sulfur-contaminated natural gas is heated to a temperature from about 200° C. to about 400° C. and contacted with an effective hydrodesulfurization catalyst. The desulfurized natural gas is then suitable as a reactant for the cracking reactor as well as a precursor for the hydrogen required in the fuel cell. Otherwise, the sulfur species can be readily chemisorbed at an elevated temperature (e.g. 200° C.) onto a zinc oxide containing adsorbent or similar material. This sulfur removal technique, using a simple guard bed, is preferred for the relatively small scale utility generation associated with the present invention.

The catalyst used for hydrocarbon cracking comprises nickel or iron dispersed on an inorganic metal oxide carrier. Preferred carriers are selected from the group consisting of aluminas (e.g. alpha, gamma, or theta alumina), cordierite, silica, magnesia, zirconia, titania, and mixtures thereof. Crystalline aluminosilicates, or zeolites (e.g. ZSM-5), may also be used as carriers, as well as molecular sieves in general. Zeolites are described according to their structure and properties in *Zeolite Molecular Sieves* by Donald W. Breck (John Wiley and Sons). Molecular sieves (e.g. SAPO-11), as understood in the art and in contrast to zeolites, contain cations other than $Al^{+3}$ and $Si^{+4}$ situated within tetrahedral sites of an extensive three-dimensional framework of oxygen atoms. Types of materials classified as molecular sieves are explained in detail in *Molecular Sieves, Principles of Synthesis and Identification* by R. Szostak (Van Nostrand Reinhold, 1989). The zeolite or molecular sieve may be used as a carrier either in unbound form or bound with an inorganic refractory oxide binder (e.g. silica). Methods of binding are well known in the art.

The dispersion of the catalytically active nickel or iron metal onto the carrier may be performed according to any suitable procedure known in the art that preferably results in a uniform dispersion of the metal. Usually the nickel or iron is deposited onto the carrier by contacting or impregnating it with an aqueous solution of a salt of the metal, such as the nitrate, chloride, bromide, hydroxide, or acetate salt.

The contacting between the carrier and the solution may be achieved, for example, by dipping the carrier into the metal salt solution or by spraying the carrier with such solution. A preferred method of preparation involves the use of a steam-jacketed rotary dryer to achieve evaporative impregnation. In this procedure, the carrier particles are immersed in an impregnating solution of any of the previously mentioned metal salts. The carrier and solution are tumbled in the dryer as it is rotated. Evaporation of the impregnation solution in contact with the carrier is expedited through the application of steam to the dryer jacket. The amount of metal deposited onto the carrier normally varies from about 0.1 to about 5 percent by weight, expressed as nickel or iron metal, of the finished catalyst. Those skilled in the art are cognizant of the contacting conditions (e.g. time, temperature, and solution concentration) required to achieve a desired loading of metal on the finished catalyst.

In general the conditions for the carbon deposition or cracking process include a temperature from about 400° C. to about 800° C., preferably from about 450° C. to about 600° C. and a pressure from about 0.5 to about 5 atmospheres. Preferably, the pressure is maintained at nearly atmospheric to drive the methane cracking reaction equilibrium toward hydrogen production, with sufficient positive pressure required to overcome any downstream flow restrictions in the fuel cell and associated piping/equipment. The gas hourly space velocity (GHSV) of the hydrocarbon containing feed stream to the reactor can range considerably from about 10 to about 100,000 hr$^{-1}$, based on hydrocarbon reactant but not based on any non-reacting diluents such as nitrogen. As is understood in the art, the hydrocarbon GHSV is the volumetric flow of hydrocarbon divided by the catalyst bed volume. This term provides a measure of how many equivalent catalyst bed volumes of hydrocarbon are processed every hour.

Carbon deposited on the cracking catalyst has been shown, under conditions as described above, to take the form of long strands or filaments. Without limiting the scope of the present invention, this deposition mechanism is believed to be highly advantageous in terms of allowing a substantial catalyst carbon loading before catalyst deactivation occurs. Deactivation is generally far more rapid for most coking mechanisms, such as those characteristic of typical refining processes, where layers of carbonaceous byproducts are coated over the catalyst surface. In the carbon deposition cycle of the present invention, the carbon deposited onto the catalyst will preferably range from about 1% to about 500% of the catalyst weight. In the context of the present invention, certain conditions, such as a demand for furnace heat from the integrated heat/electricity generation system, may mandate a shortening or lengthening of the carbon deposition cycle to improve efficiency. These considerations are discussed hereinafter in greater detail and in reference to a preferred method of system control.

A hydrogen containing effluent stream is produced from the cracking reaction, which also generates the aforementioned solid, filamentous carbon deposited onto the catalyst. In contrast to hydrocarbon reforming as means of hydrogen production, carbon oxides are not produced. Therefore, the hydrogen containing effluent is useable as a fuel cell anode reactant without further purification measures. Of course, the cracking reaction, being equilibrium limited, will generally not proceed to completion, so that unconverted hydrocarbons will remain in the effluent. Since the cracking reaction is endothermic, higher temperatures tend to drive the equilibrium toward hydrogen production, but only at the expense of undesired thermal degradation of the catalyst. Preferably, sufficient conversion is maintained throughout the cracking reaction so that the hydrogen concentration of the effluent is at least about 10% by volume and more preferably at least about 20% by volume.

In an alternate embodiment of the invention, the hydrogen containing effluent may be subjected to a purification step whereby relatively pure hydrogen is separated from unconverted hydrocarbons. The purified hydrogen would then provide improved efficiency of the fuel cell operation, compared to the use of the hydrocarbon/hydrogen effluent mixture directly as the anode reactant. The purified hydrocarbon stream can, in this case, be recycled to the cracking reactor, thereby significantly improving the overall cracking conversion. These benefits, of course, must be weighted against the cost of the specific hydrocarbon/hydrogen separation method and conditions to determine the economic viability of incorporating this additional feature.

Methods that can effect the hydrogen/hydrocarbon purification include the storage of hydrogen in the form of a metal hydride. A metal (e.g. titanium), a metal supported on a carrier (e.g. silica) or a metal alloy may all be used be used a hydrogen storage medium, capable of re-forming molecular hydrogen for later use when needed in the fuel cell operation. The main requirement of the metal-containing hydrogen storage medium is its ability to form the corresponding metal hydride. Therefore, the use of a suitable hydrogen storage medium in flow communication with the hydrogen containing effluent from the cracking reactor can purify this effluent, thereby yielding a substantially pure hydrocarbon stream (e.g. >90 vol-% hydrocarbon) for recycle to the hydrocarbon cracking reactor. Furthermore, a substantially pure hydrogen stream (e.g. >90 vol-% hydrogen) can be later formed through the conversion of the metal hydride back to the corresponding hydrogen-reactive metal and molecular hydrogen.

Therefore, in addition to providing a means of hydrogen/hydrocarbon separation, metal hydride formation is further advantageous in that it can allow for long-term hydrogen storage and re-use at selected times when electricity generation by the fuel cell is most needed. Generally, molecular hydrogen is released from its hydride state by altering the temperature and/or pressure to which the metal hydride is subjected. In the case of the present invention, the hydrogen storage medium provides hydrogen to the fuel cell in response to electricity demanded from the system. Metal alloys suitable for hydride formation are commercially available from suppliers such as The Japan Steel Works, Ltd. (Tokyo, Japan). Otherwise, the hydrogen storage medium can also comprise titanium bound with an inert support selected from the group consisting of alumina, silica, zirconia, titania, clays, and mixtures thereof.

Separation across a membrane (e.g. a palladium membrane), or cryogenic separation can also be employed for this purification. Suitable hydrogen permeable membranes that are useful for purifying the hydrogen/hydrocarbon product of the cracking reaction are described in PCT Publication No. 99/43610, which refers specifically on Page 1 to membranes developed by Buxbaum and others (*J. Membr. Sci.*, 85, 29 (1993) and U.S. Pat. Nos. 5,149,420 and 5,215,729). Thus, the present invention may include a membrane separation system for purifying the cracking reactor effluent hydrogen where the separation system comprises a palladium containing membrane film. The palladium is often advantageously combined with other permselective elements to provide Pd—Ag, Pd—Nb, and Pd—Ta membranes. The membrane can also comprise a gas permeable support onto which the Pd-containing components are dispersed. Supports that are useful in this application include ceramics, porous stainless steel, and the refractory metals tantalum, niobium, zirconium, and vanadium.

Whether or not the hydrogen containing effluent generated from the cracking reaction is purified according to the methods described above, it is generally desired to saturate both the hydrogen and oxygen containing streams to the fuel cell with water. The fuel cell reactants are normally humidified because the membranes tend to dry out and thereby lose their effectiveness for facilitating the desired transport of ions. The water used for the saturation of the reactants may originate from either the steam generated by the fuel cell itself or a separate humidifier.

As mentioned, after a suitable period of carrying out the hydrocarbon cracking reaction, usually lasting from about 1 minute to about 5 hours, the cracking catalyst will require regeneration due to a loss of catalytic activity. Therefore, following the hydrocarbon cracking step in which hydrogen is generated, the cracking catalyst can be regenerated with an oxygen-containing gas, where air is normally chosen for convenience. Conditions for the regeneration include a temperature from about 500° C. to about 1000° C., preferably about 600° C. to about 800° C., an absolute pressure from about 0.5 to about 5 atmospheres, and a GHSV based on oxygen from about 1,000 to about 100,000 hr$^{-1}$. The use of atmospheric pressure for regeneration with air is a preferred embodiment of the invention, since a simple air blower can be used to introduce oxygen into the cracking reactor. The regeneration is continued until the remaining carbon is less than about 5% by weight, based on the cracking catalyst weight, and preferably less than about 1% by weight. When oxygen is used as the regenerant, the regeneration effluent gas exiting the cracking reactor will contain a significant amount (e.g. 35% by volume) of carbon oxides, namely carbon monoxide and carbon dioxide. The major reactions characterizing the regeneration by oxygen gas are:

$$C + \tfrac{1}{2}O_2 \rightarrow CO$$

$$C + O_2 \rightarrow CO_2$$

and the reaction heats for the former (partial) oxidation and the latter (complete) oxidation reactions are, respectively, about −26 kcal/mole and −93 kcal/mole at regeneration temperature.

A desirable characteristic of the regeneration step, therefore, is the significant co-production of heat associated with the conversion of solid carbon on the catalyst to carbon oxides. This heat may be used to supply some of the energy requirement of the carbon deposition reaction, to satisfy local heating needs, or both. In terms of providing localized heat, the high temperature regeneration effluent stream proximate the reactor outlet can be exchanged with a heat distribution medium to distribute heat via radiators, vents, or other means. Common heat distribution media for buildings are air and water, which provide for localized heating and hot water utilities. In the case of the latter, the heat may be transferred to a water tank for storing and maintaining a hot water supply. After heat is exchanged from the high temperature regeneration effluent to a heat distribution medium, the effluent stream is reduced in temperature to some extent, and is therefore referred to at this point as a low temperature regeneration effluent. Any means known in the art for effecting this heat exchange may be used. Most commonly, a heat exchanger, designed to maximize the area of thermal contact between the regeneration effluent and heat distribution medium, is employed.

The most efficient use of any residual heat from the regeneration cycle of the present invention will, of course, depend upon the normal utility demands and hence the climate surrounding the building or residence incorporating the system of the present invention. It is known that a hot, gaseous stream such as the high temperature regeneration effluent can provide the necessary driving force to operate a sorption refrigeration system. In hot climates, therefore, it is desirable to combine the present invention with sorption cooling, whereby a refrigerant is driven off a sorbent, via indirect heating with a hot stream, and around a cooling loop. In this case, the heat distributing medium is a sorption cooling medium used in a sorption cooling assembly for providing cooling to the building. Details related to types of applicable sorbents, the design of sorbent cooling systems, and operating conditions are provided in several publications including, for example, U.S. Pat. No. 5,456,093.

In addition to utilizing the heat of the regeneration effluent gas, its fuel value can also be recovered if this effluent is fed directly, preferably after being combined with fuel gas and air, to a furnace burner. In this capacity, the regeneration effluent gas serves as a combustion fuel for air or water heating via a furnace. In a preferred embodiment of the invention, the high temperature regeneration effluent directly exiting the reactor from the regeneration cycle is first exchanged with any of the above heat distributing media (e.g. air, water, or a solid sorbent for sorption cooling) to provide a low temperature regeneration effluent gas. Subsequently, this low temperature regeneration effluent gas is combusted in a furnace to utilize its fuel value for heating and also to oxidize CO contained therein to $CO_2$ prior to emission of the waste gas. In this embodiment of the invention, then, a furnace is used for combusting the low temperature regeneration effluent, preferably in conjunction with oxygen (or air) and a portion of the hydrocarbon containing fuel to the cracking reactor.

Of course, the heat exchange means used to transfer heat from the high temperature regeneration effluent may itself be a furnace, so that no recovery of the regeneration effluent heat occurs (i.e. using a heat exchanger) prior to its combustion directly after exiting the reactor. In this preferred embodiment of the invention, the reactor may be located within the furnace to advantageously utilize its heat for maintaining the cracking reactor at regeneration conditions. Provisions to route the hydrocarbon fuel (e.g. methane), in this case, to both the reactor and the furnace inlet for combustion are preferably provided.

Rather than using an oxygen containing gas stream for the cracking catalyst regeneration, it is also possible to use steam or a water containing stream as a regenerant. It is generally preferred to use an oxygen containing regenerant, however, since regeneration of the coked catalyst with steam is. an endothermic reaction and hence requires external heat in addition to that needed for the cracking reaction. The primary reaction associated with steam regeneration is given by:

$C + H_2O \rightarrow CO + H_2$ and has a reaction heat of about +31 kcal/mole under typical regeneration conditions. While an additional amount of hydrogen is produced using water or steam as the regenerant, this hydrogen typically must be separated from co-produced carbon oxides before it can be used as an anode reactant in the fuel cell. The separation may be performed using, for example, pressure swing adsorption or other known methods, but, of course, an element of complexity and cost is then added to the overall system.

Whether oxygen or water is chosen as the regenerant used for the regeneration step, the present invention requires transitioning between the carbon deposition and the regeneration cycles. This essentially involves periodically alternating the feed stocks, products, and conditions associated with the cracking reactor. Preferably, the means for alternating flows comprises so-called "3-way" valves or flow diverters at the reactor inlet and outlet. The valve leading to the reactor inlet can draw feed to the reactor from either the hydrocarbon containing fuel source or a regenerant source, while a similar valve at the reactor outlet can direct the reaction product to either the heat exchange means (e.g. heat exchanger or furnace) or the fuel cell. Otherwise, simple block valves located near the reactor feed sources and near the inlets to the downstream heat exchange means and fuel cell can also be effective. Block valves, however, present a greater possibility of cross-contamination of various feeds and products than 3-way valves, since flow is not necessarily diverted exclusively to either one path or the other.

During the carbon deposition cycle, then, the valves are aligned so that flow to the reactor is taken from the hydrocarbon fuel and flow exiting the reactor is diverted to the fuel cell for electricity generation. Similarly, the regeneration cycle is characterized by flows to and from the reactor comprising, respectively, the regenerant source and the high temperature regeneration effluent. Preferably, the flow alternating valves are controllably linked so that the feed and product flow paths associated with the two modes of operation are established exclusive to one another. In other words, automated control is used to prevent hydrogen containing effluent from the cracking reaction from flowing to the heat exchange means and also to prevent regeneration effluent from flowing to the fuel cell.

A major concern related to switching between cycles is the possibility of allowing residual CO-containing effluent from the catalyst regeneration to contaminate the hydrogen source for the fuel cell. To mitigate this possibility, it is preferred to maintain the cracking reactor effluent flow to the normal pathway of the regeneration effluent (e.g. to a heat exchanger) for several minutes after initiating a given carbon deposition cycle. When the cracking reactor is sufficiently purged of any remaining CO from the regeneration step, the hydrogen rich reactor effluent can then be diverted to the fuel cell.

As an alternative to implementing this foregoing purge step, a methanation zone, comprising a bed of methanation catalyst, may be added to the system and fed by the hydrogen containing effluent. Using a methanation zone, any trace quantities of residual CO from the regeneration cycle contaminating the hydrogen feed to the fuel cell would be readily hydrogenated to methane. The small amount of methane produced would contribute only slightly to the total hydrocarbon concentration in the hydrogen containing effluent flowing either to the previously mentioned hydrogen/ hydrocarbon purification or directly to the fuel cell. As mentioned, the hydrocarbon cracking reaction generally will not proceed to completion, resulting in the presence of unconverted hydrocarbons in the hydrogen containing effluent, even without the optional methanation step. Details related to catalysts and conditions effective for carrying out the methanation reaction are known in the art and described in various publications, for example U.S. Pat. No. 3,361,535 at column 4, lines 5–44.

For design simplicity, it is preferred, in the system of the present invention, to use a single reactor alternating between carbon deposition and regeneration. Of course, it is also possible to use swing-bed systems of the prior art to alternate between the carbon deposition and regeneration cycles. This mode of operation may be used with two or more reactors having inlet and outlet flow alternating means, as described previously, for switching between the cracking reaction and catalyst regeneration cycles. The use of additional reactors, while requiring added complexity, can continuously provide both the hydrogen rich effluent from the carbon deposition cycle and the regeneration effluent from the regeneration cycle to satisfy, respectively, the electrical and heating needs of the building. If a plurality of reactors are used, the reaction heats associated with the cracking and regeneration chemistry may be optimally integrated using a feed/product exchanger to exchange heat from the high temperature regeneration effluent of one reactor to the hydrocarbon fuel of another.

The simpler, single reactor system can be coupled with an electrical storage device (e.g. a battery) capable of storing electrical power during periods when the total electricity demanded is less than that which the fuel cell generates. Thus, the electrical storage device is characterized as being in communication with the fuel cell for storing electrical potential from the fuel cell and providing electricity in response to electricity demanded from the system. Electricity storage also affords the system enough flexibility to provide electrical power when the single reactor is not producing hydrogen but is instead in its regeneration cycle. As an alternative to electrical power storage, hydrogen may also be stored, as mentioned previously, as a metal hydride. Hydrogen can then be released from its hydride state as a hydrogen gas suitable as the anode reactant for the fuel cell.

Overall, the storage of either electricity or hydrogen as a source of electricity is advantageous because the cyclical nature of the cracking reaction to generate hydrogen is effectively decoupled from the electricity needs of the building or residence. In a preferred embodiment of the present invention, the entire control scheme involves only on-off control of gas flows to and from the cracking reactor and associated components of the system, with power storage precluding the necessity of continually matching the building power consumption rate with the hydrogen production rate of the fuel processor. In this case, electric power is supplied as to the system as demanded from a battery. In turn, electricity is generated from the fuel cell to replenish the electric power inventory, based on a low voltage indication from the battery. More complicated algorithms in which feed and reformate flows to and from a hydrogen fuel process are apportioned according to heat and electricity demands are described in, for example, U.S. Pat. No. 5,985,474. In contrast to this disclosure, the on-off control system used in a preferred embodiment of the present invention provides additional design simplicity and functions similarly to the current on-off control systems used extensively in thermostats. This mode of control, as it pertains to the present invention, is described in more detail with particular reference to the drawings.

The fuel cell used in the system of present invention carries out the electrochemical conversion of oxygen and a fuel, namely the hydrogen containing effluent from the hydrocarbon cracking reaction, supplied to the anode side of the fuel cell. Oxygen, either in pure form or as air, is directed to the cathode side of the fuel cell. The generation of electricity is accompanied by the production of water from the hydrogen and oxygen consumed. Although various types of fuel cells may be used, it is preferred to use the type that includes a Proton Exchange Membrane (i.e. PEM-type fuel cell). A PEM fuel cell is favorable compared to, for example, a molten carbonate fuel cell because of its associated low temperature of operation, quick startup ability, and flexibility in meeting power demands. Details related to the components and operation of PEM-type fuel cells are known in the art and provided, for example, in the aforementioned U.S. Pat. No. 5,985,474 at column 5, line 25 to column 6, line 7. Also, as disclosed in this reference, a power conditioner is preferably linked to the fuel cell assembly in order to convert the direct current (DC) produced therein to commonly used 120- or 220-volt alternating current (AC).

The elements of the present invention have now been described with reference to their function and configuration within a heat/electricity co-generation application. It is understood that, depending on its specific use the present invention may adopt any of a number of combinations of the elements described herein without departing from the spirit and scope of the invention. The system of the present invention will now be described with reference to drawings pointing out specific embodiments of the invention; these embodiments are not meant to pose any undue limitations on the generally broad scope of the invention as set forth in the appended claims.

The system of the present invention, as shown in FIG. 1, comprises a cracking reactor 10 having an inlet 12, having an outlet 14, and defining a retention space for a catalyst (not shown). The inlet is connected, via a reactor inlet flow diverter 16 to both a hydrocarbon fuel containing source 18 and a regenerant source 20. As mentioned, the fuel source is preferably a natural gas line or header that continuously supplies fuel for residential or business use. The fuel source is connected to both the cracking reactor, through the inlet flow diverter 16, and the furnace 22, through any type of flow regulating means, for example a block valve (not shown). The regenerant may simply comprise, in a preferred embodiment, ambient air blown into the cracking reactor 10 and furnace 22 as needed. The system further comprises a cracking reactor outlet flow diverter 24 that is connected to the cracking reactor outlet 14 and is used to divert the cracking reactor product flow to either a heat exchanger 26 through a heat exchanger inlet 28, or to a fuel cell 30 through a fuel cell inlet 32. The orientation of the reactor outlet flow diverter 24 depends on whether the catalyst is being used to generate a hydrogen containing effluent gas or high temperature regeneration effluent during catalyst regeneration. The fuel cell 30 is preferably a PEM fuel cell.

The heat exchanger 26 is used to recover at least some of the heat liberated during regeneration, and available in the high temperature regeneration effluent, through exchange with any of the heat distributing media described previously, including a sorption cooling medium for a sorption cooling assembly. Accordingly, the heat exchanger 26 comprises an inlet for the high temperature regeneration effluent and an outlet 44 for a low temperature regeneration effluent resulting from the heat exchange. As an alternative to discharging the low temperature regeneration effluent, after appropriate treatment to remove residual carbon monoxide, the combustion of this stream in the furnace normally used for home heating provides a convenient means of additional heat recovery. Thus, the furnace 22 comprises a combustion gas burner inlet 46 in communication with the heat exchanger outlet 44. As shown, the burner inlet 46 is also in communication with the normal sources of combustion gas used for localized furnace heating, namely the hydrocarbon containing fuel source 18 and the regenerant source 20, if air is used as the catalyst regenerant.

The reactor inlet flow diverter 16 and reactor outlet flow diverter 24 may be any means known in the art for altering the reactor feed and product flow paths appropriately to carry out the aforementioned hydrocarbon cracking and regeneration cycles for integrated heat and electricity production. A commonly used device to divert flow is a 3-way valve, although, as mentioned, block valves may also be effective if controlled appropriately to avoid cross-contamination between types of reactor feed and product streams. In any case, it is preferred to controllably link the flow diverters to establish flow communication between the reactor inlet 12 and the hydrocarbon containing fuel source 18 only when flow communication between the reactor outlet 14 and the fuel cell inlet 22 is established. Likewise, the preferred control system will also establish flow communication between the first reactor inlet 12 and the regenerant source 20 only when flow communication between the first reactor outlet 14 and the inlet of the heat exchanger 28 is established.

The system shown in FIG. 1 also includes a battery 34, acting as an electrical storage device. The battery is in electrical communication with the fuel cell 30 for storing electrical potential that it generates and providing electricity appropriately as it is demanded. As described previously, it may be advantageous to separate the hydrogen containing effluent exiting the cracking reactor using a membrane or an adsorption system. In the illustration, therefore, a membrane separation system 36 is used to purify the hydrogen containing effluent and yield a substantially pure hydrogen stream for passage to the fuel cell 30 and a substantially pure hydrocarbon stream for recycle to the reactor 10. The membrane separation system 36 has an inlet 38 in communication with the reactor outlet flow diverter 24, a first outlet 40 in communication with the fuel cell inlet 32, and a second outlet 42 in communication with the reactor inlet flow diverter 16 and the hydrocarbon containing fuel source 18.

Figure 2:
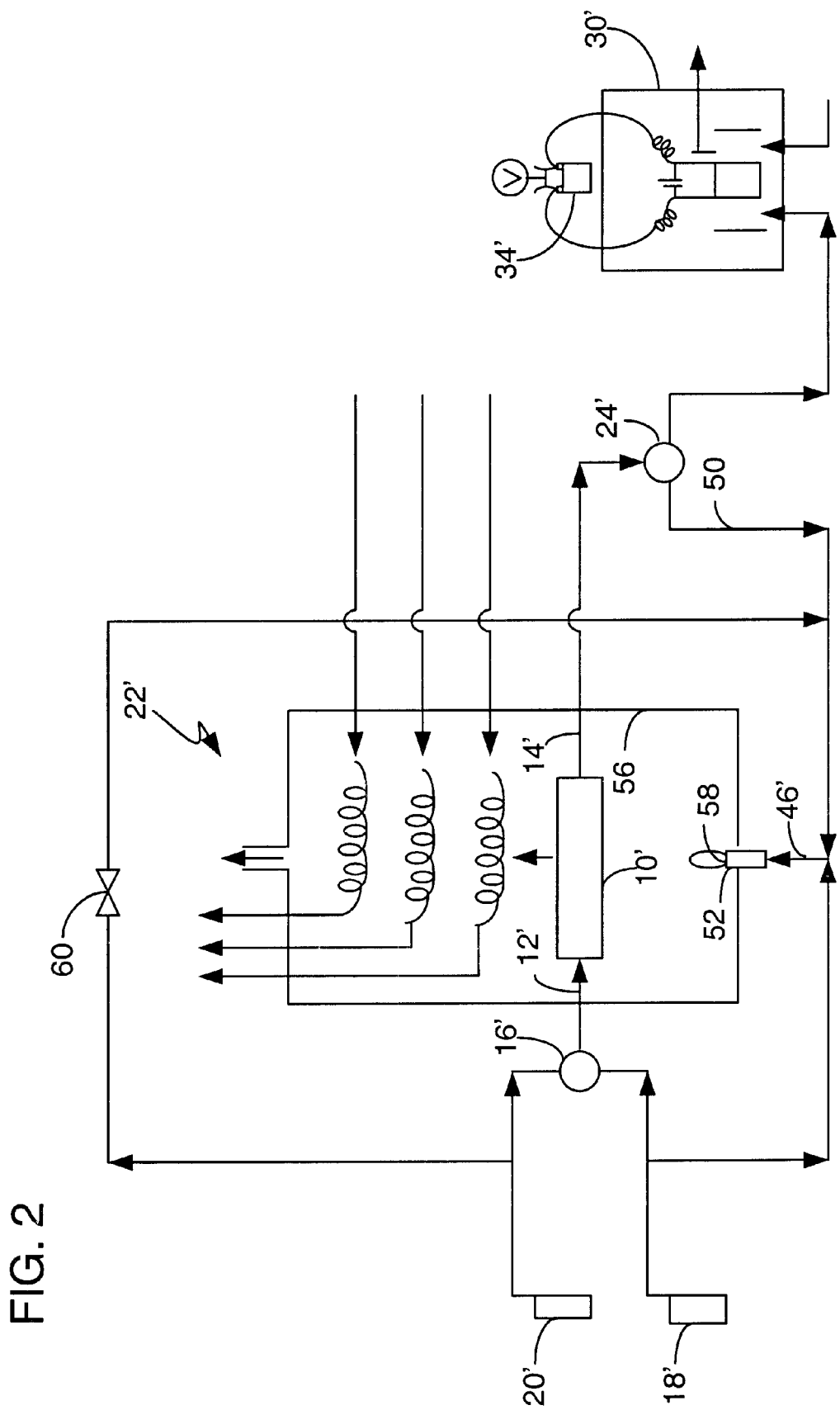
FIG. 2 is a schematic block diagram of a second embodiment of the system comprising a hydrocarbon cracking reactor, a fuel cell, reactor inlet and outlet flow diverters, and a furnace, with the reactor located therein, to combust a catalyst regeneration effluent and recover its fuel value.

A second embodiment of the system of the present invention is illustrated in FIG. 2, where elements in common with those of FIG. 1 are given the same numbers, but labeled with a prime (') thereafter. In contrast to FIG. 1, the means for exchanging heat from the high temperature regeneration effluent in FIG. 2 is not a heat exchanger, but rather a furnace 22'. This furnace 22' is now directly in flow communication with the reactor outlet flow diverter along the reactor outlet 50, that is not in flow communication with the fuel cell 30'. The furnace comprises a burner 52 having an inlet 46' external to a heating chamber 56 for containing a hot flue gas exiting the burner 52 and comprising an outlet 58 within the heating chamber 56. The reactor 10' in FIG. 2 is located within the furnace heating chamber 56, thereby allowing it to be heated from hot flue gas exiting the furnace burner 52. This mode of operation provides a source of heat to help maintain proper conditions for the carbon deposition and regeneration cycles, as well as minimize any external heat requirement. Of course, the furnace 22' also transfers heat from the flue gas exiting the burner 52 to any of the heat distributing media mentioned previously.

As in FIG. 1, the burner inlet 46' is also in communication with the hydrocarbon containing fuel source 18' and the regenerant source 20', if air is used as the catalyst regenerant.

This allows the furnace to be readily activated in response to a demand for heat or sorption cooling. In a preferred embodiment of the invention, an on-off valve 60 is located between the hydrocarbon containing fuel gas source and the furnace burner inlet 46', with the valve 60 activated or controlled by a means for detecting the heating demand.

In terms of the overall control of the system as illustrated in FIG. 2, it is desirable to adjust the durations for both the carbon deposition and regeneration cycles according to whether the furnace 22' is in operation. When the furnace 22' is operating in response to a demand for heat, relatively long durations are appropriate since furnace heat is being used, in this case, to help maintain the reactor temperature. Directionally, increasing the duration of the carbon deposition cycle allows for operation at reduced temperatures. This, in turn, improves the overall catalyst life, since the detrimental effects of thermal degradation (e.g. loss of catalyst surface area) are mitigated. If the furnace 22' is not operating, however, relatively short durations of carbon deposition and regeneration are suitable. This has been determined because the residual heat from the regeneration cycle, which provides a hot bed of catalyst prior to restarting the carbon deposition, is not allowed to dissipate as easily during this period of endothermic reaction. Thus, in the absence of furnace heat, the reaction heat from the regeneration cycle is more efficiently conserved and used when the cycle durations are relatively short.

Appropriately, then, the system as illustrated in FIG. 2 will preferably comprise a means for detecting a demand for heat, where the means is controllably linked to both the reactor inlet flow diverter 16' and the reactor outlet flow diverter 24'. If the demand for heat (or sorption cooling) is then confirmed, the detection means assigns a first duration of carbon deposition and a first duration of regeneration. Similarly, in the absence of a demand, a second duration of carbon deposition and a second duration of regeneration are assigned. According to the explanation above, the first duration of carbon deposition is necessarily longer than the second duration of carbon deposition and the first duration of regeneration is longer than the second duration of regeneration.

The system will also preferably comprise a means for detecting a demand for electricity, where this means is also controllably linked to the first reactor inlet flow diverter 16' and the first reactor outlet flow diverter 24'. If the demand for electricity exists, the means then initiates the carbon deposition cycle to yield the hydrogen containing effluent and thereby generate electricity using the fuel cell 30'. This electrical potential is then stored in the battery 34', to replenish the amount depleted from the electricity demanded. The demand for electricity is preferably determined by monitoring the voltage level of the battery 34'. When the voltage falls below a set value, the carbon deposition and regeneration cycles are automatically initiated.

Figure 3:
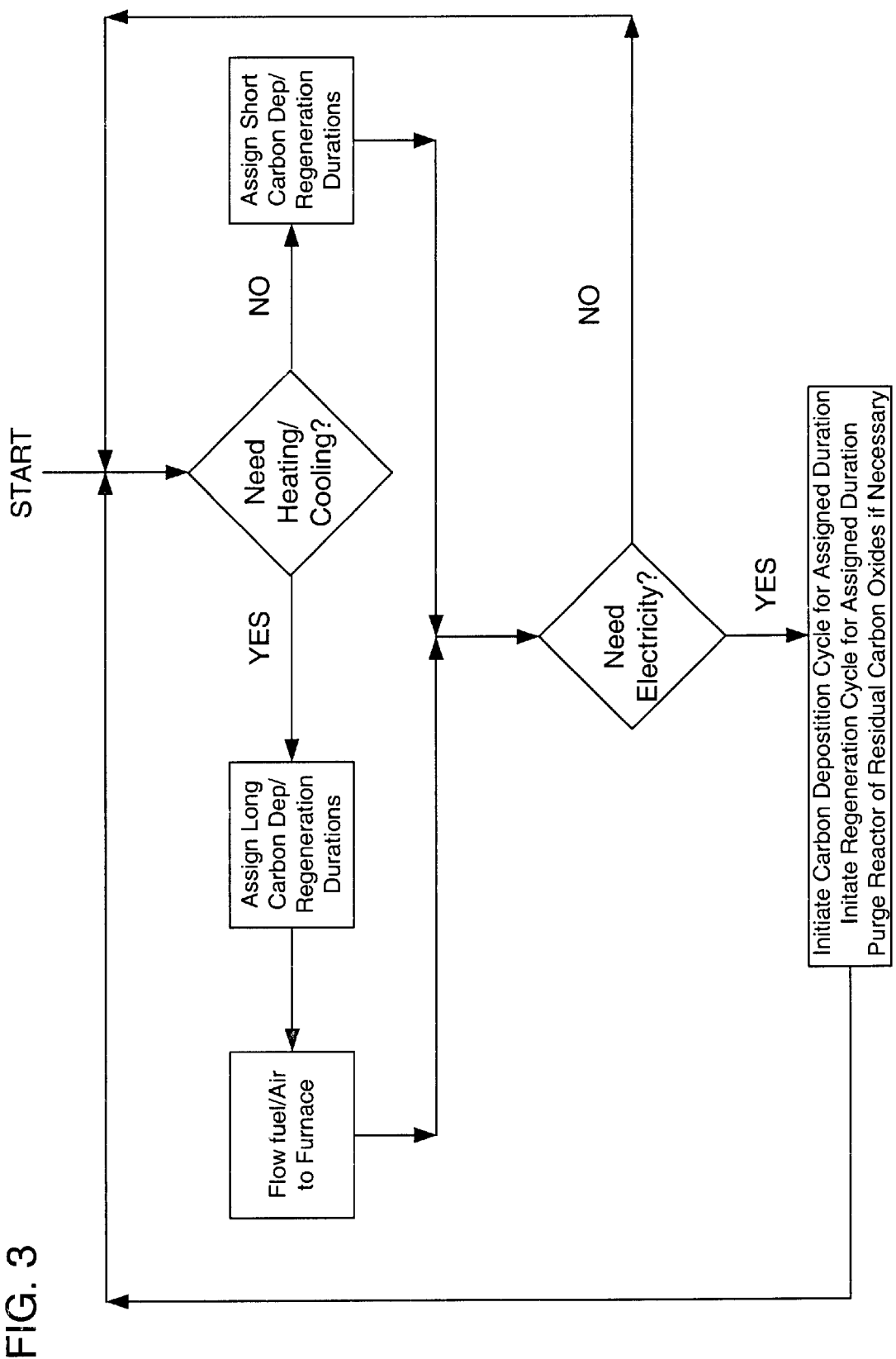
FIG. 3 is a flow chart illustrating an exemplary method of controlling a heat and electricity co-generation system where hydrogen that is produced from hydrocarbon cracking is used to generate electricity in a fuel cell.

The overall control algorithm for a heat/electricity co-generation system such as that depicted in FIG. 2 can be described with reference to the flow chart of FIG. 3. Specifically, the diagram represents a control method useful for a system comprising a hydrocarbon cracking reactor, a fuel cell in communication with a hydrogen containing effluent stream from the reactor, a furnace in communication with a regeneration effluent stream from the reactor, and a battery in communication with the fuel cell. The control method comprises first determining a demand $D_H$ for heat from the furnace. This demand is based on a deviation between a measured temperature and a set point temperature, where the temperature may be, for example, an ambient air temperature or a water supply temperature. A demand for furnace heat, as stated previously, may arise from a need for localized cooling from a sorption cooling system. Thus, either a positive or negative deviation between the measured and set point temperature, if sufficient, may signal a demand for furnace heat.

When it is determined that a demand exists, that is, $D_H>0$, a carbon deposition cycle time $T_{cd}=T_a$ and a regeneration cycle time $T_{regen}=T_b$, are assigned, and fuel gas (and combustion air) is allowed to flow to the furnace to satisfy the demand. Since the furnace in this case is in operation, relatively long cycle times, for reasons stated above, are used. When no demand exists, or $D_H=0$, a carbon deposition cycle time $T_{cd}=T_1$ and a regeneration cycle time $T_{regen}=T_2$ are assigned. In this case, relatively short cycle times are chosen, so that $T_1<T_a$ and $T_2<T_b$ necessarily. The control method then prohibits the flow of fuel gas (and combustion air) to the furnace. Preferably, the longer duration for carbon deposition $T_a$ is from about 0.5 to about 3 hours and the shorter duration for carbon deposition $T_1$ is from about 1 to about 10 minutes.

In the case of either a positive or no demand for furnace heat, a demand $D_E$ for electricity is determined from a deviation between a measured voltage level of the battery and a set point voltage. The set point voltage of the battery may or may not represent the battery's full capacity. Preferably, the set point will be less than the capacity, allowing the full extent to which the fuel cell generates electricity from a given carbon deposition cycle to be saved for subsequent use.

When there is no demand for electricity, the control method repeats the first step of determining $D_H$ and following steps at this point. However, when it is found that a demand for electricity exists, that is $D_E>0$, a carbon deposition cycle is initiated. As described before, this cycle comprises, reacting, for a duration $T_{cd}$, a hydrocarbon containing fuel gas stream under cracking conditions in the presence of a catalyst to yield a hydrogen containing effluent stream for generating electricity in the fuel cell and subsequently storing electrical potential in the battery. As explained above, the variable $T_{cd}$ may be assigned either a high or a low value, associated with a relatively long or short duration, depending on the previously determined demand for heat.

After the carbon deposition cycle, the previously described regeneration cycle is initiated, where this cycle comprises reacting, for a duration $T_{regen}$, a regenerant stream under regeneration conditions with carbon deposited on the catalyst during the carbon deposition cycle. A regeneration effluent stream is produced, which provides heat by its combustion in the furnace. Again, the assignment of either a high or low value to $T_{regen}$, the duration of the regeneration step, will depend on the outcome of the determination of the demand for furnace heat. After the regeneration step, it may be desired to incorporate a purge step to remove from the reactor, using the hydrocarbon containing fuel gas, trace carbon oxides generated during the regeneration. Alternatively, this purge may be accomplished just prior to the carbon deposition cycle.

After the carbon deposition/regeneration combination is completed, the control algorithm, beginning with the first step of determining a demand for heat, is repeated for the desired operating time of the integrated co-generation system.

What is claimed is:

1. An apparatus for providing both heat and electricity to a building comprising:

a) a cracking reactor having a feed inlet, a product outlet, and defining a catalyst retention space;
b) a fuel cell having an inlet;
c) a heat exchange means having an inlet;
d) a cracking reactor inlet flow diverter, having a first inlet connection in communication with a fuel source, having a second inlet connection in communication with a regenerant source, and having an outlet connection in communication with the cracking reactor inlet, and;
e) a cracking reactor outlet flow diverter, having an inlet in communication with the cracking reactor outlet, having a first outlet connection in communication with the fuel cell inlet, and having a second outlet connection in communication with the inlet of the heat exchange means.

2. The apparatus of claim 1 where the cracking reactor inlet flow diverter and the cracking reactor outlet flow diverter are controllably linked.

3. The apparatus of claim 1 further comprising a heat demand detector controllably linked to the cracking reactor inlet flow diverter and the cracking reactor outlet flow diverter.

4. The apparatus of claim 1 further comprising an electricity demand detector controllably linked to the cracking reactor inlet flow diverter and the cracking reactor outlet flow diverter.

5. The apparatus of claim 1 where the fuel cell is a PEM fuel cell.

6. The apparatus of claim 1 further comprising an electricity storage device in electrical communication with the fuel cell.

7. The apparatus of claim 6 where the electricity storage device is a battery.

8. The apparatus of claim 1 further comprising a membrane separation system comprising a hydrogen permeable membrane, the system having an inlet in communication with the first outlet connection of the cracking reactor outlet flow diverter, a first outlet in communication with the fuel cell inlet, and a second outlet in communication with the first inlet connection of the cracking reactor inlet flow diverter.

9. The apparatus of claim 8 where the hydrogen permeable membrane comprises a film selected from the group consisting of Pd, Pd—Ag, Pd—Nb, and Pd—Ta.

10. The apparatus of claim 9 where the hydrogen permeable membrane further comprises a gas permeable support having the film deposited thereon, the support selected from the group consisting of ceramic, porous stainless steel, tantalum, niobium, zirconium, vanadium, and mixtures thereof.

11. The apparatus of claim 1 further comprising a hydrogen storage medium having an inlet in communication with the first outlet connection of the cracking reactor outlet flow diverter, having a first outlet in communication with the fuel cell inlet, and having a second outlet in communication with the first inlet connection of the cracking reactor inlet flow diverter.

12. The apparatus of claim 11 where the hydrogen storage medium comprises a metal capable of forming a metal hydride.

13. The apparatus of claim 12 where the metal is titanium bound with an inert support selected from the group consisting of alumina, silica, zirconia, titania, clays, and mixtures thereof.

14. The apparatus of claim 1 further comprising a methanation zone having an inlet in flow communication with the first outlet connection of the cracking reactor outlet flow diverter and an outlet in flow communication with the fuel cell inlet, the methanation zone defining a catalyst retention space.

15. The apparatus of claim 1 where the heat exchange means is a heat exchanger having an inlet in communication with the second outlet connection of the cracking reactor outlet flow diverter and an outlet for a low temperature regeneration effluent.

16. The apparatus of claim 15 further comprising a furnace having a combustion gas burner inlet in communication with the heat exchanger outlet.

17. The apparatus of claim 1 where the. heat exchange means is a furnace comprising a burner having an inlet external to a heating chamber and an outlet within the heating chamber.

18. The apparatus of claim 17 where the cracking reactor is within the heating chamber.

19. The apparatus of claim 17 further comprising an on-off valve having an inlet in communication with the fuel source and an outlet in communication with the burner inlet.

20. The apparatus of claim 19 further comprising a means for detecting a demand for furnace heat, the means controllably linked to the on-off valve.

21. A method of providing both heat and electricity to a building comprising:
a) cracking, during a carbon deposition cycle, a hydrocarbon fuel under cracking conditions in a hydrocarbon cracking reactor and in the presence of a catalyst to yield a hydrogen containing effluent;
b) passing the hydrogen containing effluent to a fuel cell anode to generate electricity;
c) contacting, during a regeneration cycle under regeneration conditions and in the hydrocarbon cracking reactor, a regenerant with carbon deposited on the catalyst during the carbon deposition cycle to regenerate the catalyst and yield a high temperature regeneration effluent;
d) flowing the high temperature regeneration effluent to a heat distributing medium to exchange heat with the heat distributing medium and provide heat to the building;
e) alternating a feed flow to the hydrocarbon cracking reactor between the hydrocarbon fuel during the carbon deposition cycle and the regenerant during the regeneration cycle; and,
f) alternating a product flow from the hydrocarbon cracking reactor between the hydrogen containing effluent to the fuel cell during the carbon deposition cycle and the regeneration effluent to the heat exchanger during the regeneration cycle.

22. The method of claim 21 where the hydrocarbon fuel is selected from the group consisting of natural gas, methane, ethane, propane, butane, and mixtures thereof.

23. The method of claim 21 where the regenerant stream comprises an oxygen gas containing stream or a water containing stream.

24. The method of claim 21 where the catalyst comprises iron or nickel metal dispersed on an inorganic metal oxide carrier selected from the group consisting of alpha alumina, gamma alumina, theta alumina, cordierite, silica, magnesia, zirconia, titania and mixtures thereof.

25. The method of claim 21 where the cracking conditions include a temperature from about 400° C. to about 800° C., an absolute pressure from about 0.5 to about 5 atmospheres, a gas hourly space velocity from about 10 to about 100,000 $hr^{-1}$, a carbon loading endpoint from about 1% to about 500% carbon by weight, relative to the catalyst weight, and a hydrogen concentration in the hydrogen containing effluent stream of more than about 10% by volume.

26. The method of claim 21 where the regeneration conditions include a temperature from about 500° C. to about 1000° C., an absolute pressure from about 0.5 to about 5 atmospheres, a gas hourly space velocity based on oxygen from about 1,000 to about 100,000 hr$^{-1}$, and a regeneration endpoint of less than about 5% carbon by weight, relative to the catalyst weight.

27. The method of claim 21 where the fuel cell is a PEM fuel cell.

28. The method of claim 21 further comprising storing electrical potential from the fuel cell in an electricity storage device in electrical communication with the fuel cell, where the storage device provides electricity in response to a demand.

29. The method of claim 28 where the storage device is a battery.

30. The method of claim 21 further comprising purifying the hydrogen containing effluent stream, using a membrane separation system, to yield a substantially pure hydrogen stream for passage to the fuel cell and a substantially pure hydrocarbon stream for recycle to the hydrocarbon cracking reactor, the membrane separation system comprising a hydrogen permeable membrane.

31. The method of claim 30 where the hydrogen permeable membrane comprises a film selected from the group consisting of Pd, Pd—Ag, Pd—Nb, and Pd—Ta.

32. The method of claim 31 where the hydrogen permeable membrane further comprises a gas permeable support having the film deposited thereon, the support selected from the group consisting of ceramic, porous stainless steel, tantalum, niobium, zirconium, vanadium, and mixtures thereof.

33. The method of claim 21 further comprising purifying the hydrogen containing effluent stream, using a hydrogen storage medium, to yield a substantially pure hydrocarbon stream for recycle to the hydrocarbon cracking reactor, the hydrogen storage medium comprising a metal that is capable of forming a metal hydride.

34. The method of claim 33 where the hydrogen storage medium provides hydrogen to the fuel cell in response to a demand for electricity.

35. The method of claim 33 where the metal is titanium bound with an inert support selected from the group consisting of alumina, silica, zirconia, titania, clays, and mixtures thereof.

36. The method of claim 26 where the heat distributing medium is selected from the group consisting of air, water, and a sorption cooling medium.

37. The method of claim 21 further comprising initiating the carbon deposition cycle to yield the hydrogen containing effluent in response to a demand for electricity.

38. The method of claim 21 further comprising assigning, using an on-off controller, a first duration of carbon deposition and a first duration of regeneration in response to a demand for heat, and otherwise assigning a second duration of carbon deposition and a second duration of regeneration, where the first duration of carbon deposition is longer than the second duration of carbon deposition and the first duration of regeneration is longer than the second duration of regeneration.

39. The method of claim 21 further comprising converting carbon monoxide and hydrogen in the hydrogen containing effluent to methane in the presence of a methanation catalyst to yield a treated effluent for passage to the fuel cell.

40. The method of claim 21 where step (d) comprises passing the high temperature regeneration effluent to a first inlet of a heat exchanger and passing the heat distributing medium to a second inlet of the heat exchanger to effect a heat exchange and yield a low temperature regeneration effluent exiting a first outlet of the heat exchanger.

41. The method of claim 40 further comprising combusting the low temperature regeneration effluent in a furnace to provide heat.

42. The method of claim 21 where step (d) comprises combusting the high temperature regeneration effluent in a furnace to provide heat.

43. The method of claim 42 further comprising mixing the high temperature regeneration effluent with a furnace fuel for combustion in the furnace.

44. The method of claim 43 where the furnace fuel comprises the hydrocarbon fuel.

45. The method of claim 44 further comprising starting, using an on-off controller, flows of the hydrocarbon fuel and an oxygen containing combustion gas to the furnace in response to a demand for furnace heat.

46. A method of controlling a system for generating both heat and electricity, the system comprising a hydrocarbon cracking reactor, a fuel cell in communication with a hydrogen containing effluent stream from the reactor, a furnace in communication with a regeneration effluent stream from the reactor, and a battery in communication with the fuel cell, the method comprising:

a) determining a demand $D_H$ for heat from the furnace from a deviation between a measured temperature and a set point temperature;

b) assigning, when $D_H>0$, a carbon deposition cycle time $T_{cd}=T_a$ and a regeneration cycle time $T_{regen}=T_b$, and allowing fuel gas flow to the furnace;

c) assigning, when $D_H=0$, a carbon deposition cycle time $T_{cd}=T_1$ and a regeneration cycle time $T_{regen}=T_2$ where $T_1<T_a$ and $T_2<T_b$, and preventing fuel gas flow to the furnace;

d) determining a demand $D_E$ for electricity from a deviation between a measured voltage level of the battery and a set point voltage;

e) initiating, when $D_E>0$, a carbon deposition cycle comprising reacting, for a duration $T_{cd}$, a hydrocarbon containing fuel gas stream under cracking conditions in the presence of a catalyst to yield a hydrogen containing effluent stream for generating electricity in the fuel cell and subsequently storing electrical potential in the battery;

f) initiating a regeneration cycle comprising reacting, for a duration $T_{regen}$, a regenerant stream under regeneration conditions with carbon deposited on the catalyst during the carbon deposition cycle to yield a regeneration effluent stream for providing heat by combustion in the furnace;

g) repeating, when $D_E=0$, steps (a) to (f);

h) repeating steps (a) to (g) for a finite period of operation.

47. The method of claim 46 further comprising, after step (f), purging the reactor of carbon oxides from the regeneration cycle by flowing the fuel gas to the reactor to yield a purge effluent for combustion in the furnace.

48. The method of claim 47 where $T_a$ is from about 0.5 to about 3 hours and $T_1$ is from about 1 to about 10 minutes.

* * * * *